May 6, 1947.	S. I. TOURSHOU	2,420,211
PULSE-ECHO RADIO SYSTEM TESTING MEANS
Filed June 12, 1944
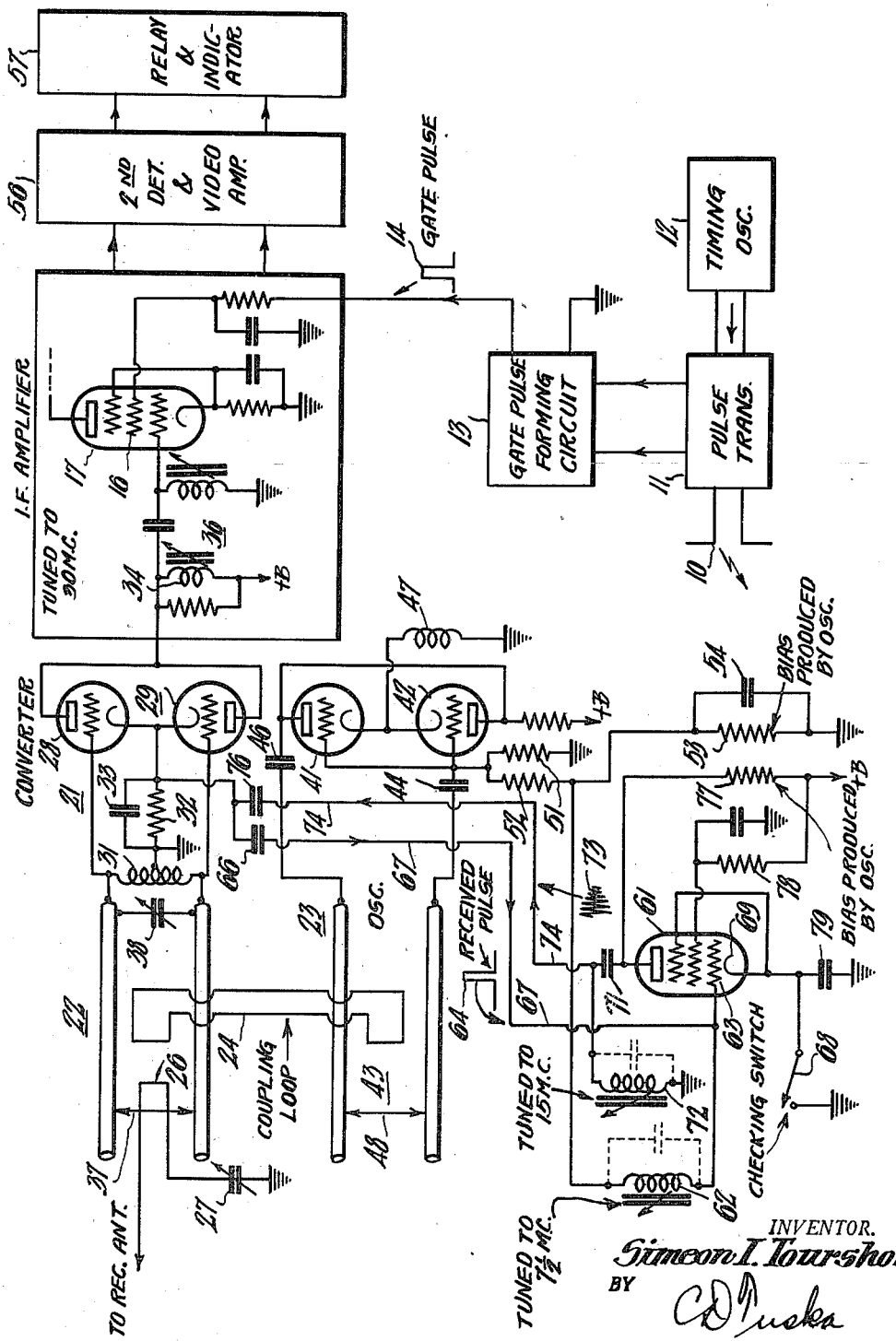
INVENTOR.
Simeon I. Tourshou
BY
ATTORNEY Patented May 6, 1947

2,420,211

UNITED STATES PATENT OFFICE 2,420,211

PULSE-ECHO RADIO SYSTEM TESTING MEANS

Simeon I. Tourshou, Philadelphia, Pa., assignor to Radio Corporation of America, a corporation of Delaware Application June 12, 1944, Serial No. 539,917

6 Claims. (Cl. 250—1.66)

My invention relates to radio pulse-echo systems and particularly to a system designed to give an indication whenever a radio wave reflecting object moves into a certain region or location.

The invention will be described particularly with respect to a warning system for an aircraft such as a fighter airplane. The system is designed especially to warn the pilot when an enemy airplane approaches from the rear and comes into a danger zone. To accomplish this, the pulse receiver is blocked except during the application of a "gate" pulse which is timed to allow only pulses reflected from the danger zone to pass through the receiver. If the pilot is to rely on the warning system, it is important that he have some way of checking the system periodically to make certain that it is in operative condition.

An object of the present invention is to provide a method of and means for checking a warning system of the above-mentioned type to determine whether it is in operative condition.

A further object of the invention is to provide an improved pulse-echo system wherein means is provided to check the system as to operativeness.

A still further object of the invention is to provide an improved radio pulse-echo warning system for fighter aircraft.

According to a preferred embodiment of the invention, the checking circuit comprises an amplifier tube, which will be referred to as the checker tube, having in its grid circuit an inductance coil that is tuned to frequency that is much higher than the pulse repetition rate. Some of the energy of a transmitted pulse feeds directly into the receiver, and this received pulse is applied to the tuned inductance coil whereby it "rings" and produces a damped wave upon the occurrence of each transmitted pulse. These damped waves last long enough to extend into the region of the gate pulse. If a checking switch is closed, the damped waves are amplified by the checker tube and applied to the receiver input circuit whereby an indication of pulse reception will be obtained if the system is in operative condition.

Other objects, features and advantages of the invention will appear from the following description taken in connection with the accompanying drawing in which the single figure is a circuit and block diagram of a preferred embodiment of the invention.

The drawing shows a complete pulse-echo system that is to be located in an airplane with a directive antenna 10 positioned to radiate pulses to the rear. A receiving antenna (not shown) is similarly positioned to receive these pulses after reflection. Or, if preferred, a single antenna may be duplexed in a well known manner to function for both transmitting and receiving.

The radio pulses are supplied to the antenna 10 from a radio pulse transmitter 11. The timing of the pulse modulation is controlled by a timing oscillator 12. A gate pulse forming circuit 13 which receives pulses from the transmitter 11 supplies positive gate pulses 14 of the correct timing and duration to the screen grid 16 of one or more intermediate-frequency amplifier tubes 17. One specific circuit design for the transmitter and gate pulse circuit is described and claimed in copending application Serial No. 515,496, filed December 24, 1943, in the names of Simeon I. Tourshou and Robert Trachtenberg and entitled Radio pulse-echo system.

The pulse receiver portion of the system is of the superheterodyne type comprising a first detector or converter 21 having a tuned input circuit or line 22 and further comprising a local oscillator 23 coupled to the converter 21 through a coupling loop 24. The receiving antenna (not shown) is coupled through a coupling loop 26 to the tuned input circuit 22. The receiving antenna may be tuned by a variable capacitor 27.

The converter 21 may be of the full-wave rectifier type consisting of detector tubes 28 and 29. The grids of tubes 28 and 29 are connected to opposite sides of the tuned line 22. A coil 31, which acts as a choke coil at the carrier frequency, is connected across the tuned line 22 and grounded at its midpoint. The coil 31 has a low impedance at the intermediate frequency to avoid degeneration. A cathode bias resistor 32, shunted by a capacitor 33, is connected between the grounded midpoint and the cathodes of the tubes 28 and 29. The anodes of the tubes 28 and 29 are connected to the primary coil 34 of an intermediate-frequency transformer 36.

The tuned input circuit 22 may be tuned to the carrier frequency of the pulse transmitter 11 by means of a shorting bar 37 and a variable capacitor 38.

The local oscillator 23 may comprise a pair of vacuum tubes 41 and 42 that are connected in parallel with each other. Their grids are connected to one side of a tuned line 43 through a coupling capacitor 44 while their anodes are connected to the other side of the line 43 through a coupling capacitor 46. The cathodes of tubes 41 and 42 are connected through an inductance coil 47 to ground. The oscillator 23 is tuned by means of a shorting bar 48 to the correct frequency for producing the desired intermediate frequency (30 megacycles in the present example). All tuning of the receiver is fixed after the initial tuning adjustments.

The grids of oscillator tubes 41 and 42 are also connected through a grid leak resistor 51 to ground. In parallel with resistor 51 there is a resistor 52 and a resistor 53 in series with each other. The resistor 53 is shunted by a capacitor 54 whereby a bias voltage for the oscillator 23 (and also for the checker tube 61 as explained hereinafter) builds up across resistor 53.

In operation, the I.-F. amplifier is blocked by suitable biasing on the amplifier tube 16 and on other I.-F. amplifier tubes (not shown) in the absence of a positive gate pulse 14. Therefore, a reflected pulse picked up by the receiving antenna can pass through the I.-F. amplifier only if the pulse has been reflected from an aircraft that has entered the danger zone corresponding to the timing and duration of the gate pulse. In that event, if the warning system is in operative condition, the reflected pulses pass through the I.-F. amplifier, are detected and amplified by a second detector and a video amplifier indicated at 56, and are applied to a relay and indicator unit 57 that warns the pilot that an enemy aircraft has entered the danger zone.

Referring now to the checking circuit itself, it includes an amplifier tube 61, referred to as the checker tube, and a tuned coil 62 connected between the control grid 63 of the tube 61 and the high potential end of the bias resistor 53. The coil 62 may resonate with its distributed capacity, indicated by the dotted lines, for example. The coil 62 is tuned to 7½ megacycles per second in the specific example being described whereby it "rings" when shock excited by a pulse 64, received directly from the transmitter, to produce a damped wave train. The pulses 64 for "ringing" the coil 62 are applied from the cathode of the converter tubes 28 and 29 through a blocking capacitor 66 and a conductor 67 to the grid end of the coil 62. The pulses 64 may recur at the rate of 400 per second and have a duration of 0.4 microsecond, for example.

It should be noted that the pulses 64 are video frequency pulses of large amplitude, their amplitude being of the order of 100 volts, for example. That they are video frequency pulses results from the fact that the pulses which are transmitted directly from the transmitter to the converter 21 are of such large amplitude compared with the amplitude of the local oscillator signal that the converter 21 rectifies them substantially independently of the local oscillator.

A checking switch 68 is provided which is normally open. When the switch 68 is closed to check the system for operativeness, it connects the cathode 69 of tube 61 to ground whereby voltage is applied between the cathode 69 and the anode and screen grid of the tube 61 so that the damped wave trains from the coil 62 are amplified and supplied through a blocking capacitor 71 to a second tuned coil 72 in the anode circuit of the tube 61. The coil 72 may resonate with its distributed capacity, indicated by the dotted lines, for example. The coil 72 is tuned to double the frequency to which coil 62 is tuned, i. e., to 15 megacycles in the present example. Thus, there are trains of damped waves 73 appearing across the tuned coil 72. The damped wave trains 73 are applied from the anode end of coil 72 through a conductor 74 and a coupling capacitor 76 to the cathodes of the converter tubes 28 and 29. The 15 megacycle wave trains 73 generate in the plate circuit of converter 21 second harmonic wave trains of 30 megacycles, which are impressed upon the input circuit of the 30 megacycle I.-F. amplifier. Since a wave train 73, and the corresponding second harmonic wave train, have not yet died down when the gate pulse 14 occurs, a portion of the second harmonic wave train will pass through the I.-F. amplifier and operate the indicator unit 57 if the complete pulse-echo system is operative. The use of the 30 megacycle second harmonic output of the converter 21 is advantageous both because it simplifies the filtering required for preventing feedback and because it makes it easier to produce wave trains of the desired amplitude at the "ringing" coil 72.

Referring again to the checking tube 61 and associated connections, a D.-C. operating voltage is applied to its anode and screen grid through resistors 77 and 78, respectively. The cathode 69 preferably is connected to ground for alternating current through a capacitor 79.

It may be noted that the coil 72 may be omitted if the pulse 64 has a sufficiently steep wave front. In the present example, however, where the comparatively wide pulse 64 of 0.4 microsecond is employed, it is desirable to shock excite a 15 megacycle tuned coil by means of the intermediate circuit comprising the 7.5 megacycle tuned coil 62.

Since the I.-F. amplifier has a band width of 4 to 5 megacycles, the coils 62 and 72 need not be tuned exactly to 7.5 megacycles and 15 megacycles, respectively, although the one-to-two tuning ratio should be maintained so that successive cycles of the wave trains across coil 62 will reinforce the ringing of coil 72. For example, the coils 62 and 72 may be tuned to 7 and 14 megacycles, respectively, or to 6.75 and 13.5 megacycles, respectively.

It may be noted also that the checker tube 61 may be replaced by a relay providing it is not required that the circuit shall check the operation of the local oscillator. In this case, the wave trains from the coil 62 may be applied directly to the coil 72 (or through a tube functioning only as an amplifier) while the relay normally maintains a short circuit across the coil 72. To check the apparatus, the relay is actuated to remove the short circuit from the coil 72 whereby the wave trains 73 are applied to the converter 21.

From the foregoing description it will be evident that most of the system components are checked as to operativeness when the checking switch 68 is closed. For example, the indicator will not be actuated under the following conditions:

(1) If there are no pulses being transmitted or if the transmitted pulses are of weak signal strength.

(2) If the gate pulse 14 is not being generated.

(3) If either the converter 21, the I.-F. amplifier, the second detector or the video amplifier is inoperative.

(4) If the oscillator 23 is not oscillating, since this results in taking bias off the grid 63 of the checker tube 61.

I claim as my invention:

1. In a pulse-echo system comprising a pulse transmitter and a pulse receiver and further comprising gating means for causing the receiver to pass a received pulse during a predetermined time interval, a checking circuit for checking the operativeness of said system, said checking circuit comprising a circuit that is resonant at a frequency which is high with respect to the repetition rate of the transmitted pulses, means for applying to said resonant circuit pulses which are received directly from the transmitter whereby each of said received pulses produces a damped wave train, and means for applying said wave trains to the input circuit of the pulse receiver, each of said wave trains extending into said predetermined time interval whereby the receiver may pass a portion of each wave train.

2. In a pulse-echo system comprising a pulse transmitter and a pulse receiver and comprising gating means for causing the receiver to pass a received pulse during a predetermined time interval, said receiver being of the superheterodyne type comprising a first detector and a local oscillator, a checking circuit for checking operativeness of said system, said checking circuit comprising an amplifier tube and an associated tuned circuit that is resonant at a frequency which is high with respect to the repetition rate of the transmitted pulses, means for shock exciting said tuned circuit by means of pulses received directly from the transmitter whereby each of said received pulses produces a damped wave train, said last-mentioned wave trains extending into said predetermined time interval, and means for applying said last-mentioned wave trains to the input circuit of said first detector.

3. In a pulse-echo system comprising a pulse transmitter and a pulse receiver and comprising gating means for causing the receiver to pass a received pulse during a predetermined time interval, said receiver being of the superheterodyne type comprising a converter and a self-biased local oscillator, a checking circuit for checking operativeness of said system, said checking circuit comprising an amplifier tube to which at least a portion of said oscillator self-bias is applied and an associated tuned circuit that is resonant at a frequency which is high with respect to the repetition rate of the transmitted pulses, means for shock exciting said tuned circuit by means of pulses received directly from the transmitter whereby each of said received pulses produces a damped wave train, said last-mentioned wave trains extending into said predetermined time interval, and means for applying said last-mentioned wave trains to the input circuit of the pulse receiver.

4. In a pulse-echo system comprising a pulse transmitter and a pulse receiver and further comprising gating means for causing the receiver to pass a received pulse during a predetermined time interval, a checking circuit for checking the operativeness of said system, said checking circuit comprising an amplifier tube having an input circuit and an output circuit, said input circuit being resonant at a frequency that is high with respect to the repetition rate of the transmitted pulses, means for applying pulses received directly from the transmitter to said resonant input circuit whereby each of said received pulses produces a damped wave train, a resonant circuit in the output circuit of said tube which is tuned to a harmonic of the frequency to which said input circuit is tuned whereby damped wave trains appear across said output circuit, and means for applying said last-mentioned wave trains to the input circuit of the pulse receiver, each of said last-mentioned wave trains extending into said predetermined time interval whereby the receiver may pass a portion of each wave train.

5. In a pulse-echo system comprising a pulse transmitter and a pulse receiver and comprising gating means for causing the receiver to pass a received pulse during a predetermined time interval, said receiver comprising a detector and an amplifier, a checking circuit for checking operativeness of said system, said checking circuit comprising a tuned circuit that is resonant at a frequency that is equal to one-half one of the frequencies falling within the pass range of said amplifier, said resonant frequency being high with respect to the repetition rate of the transmitted pulses, means for shock exciting said tuned circuit by means of pulses received directly from the transmitter whereby each of said received pulses produces a damped wave train, said wave trains extending into said predetermined time interval, means for applying said wave trains to said detector with said wave trains having sufficient amplitude to produce a second-harmonic wave train, and means for applying said second-harmonic wave train to said amplifier.

6. In a pulse-echo system comprising a pulse transmitter and a pulse receiver and comprising gating means for causing the receiver to pass a received pulse during a predetermined time interval, said receiver being of the superheterodyne type comprising a first detector, a local oscillator, and an intermediate-frequency amplifier, a checking circuit for checking operativeness of said system, said checking circuit comprising an amplifier tube and an associated tuned circuit that is resonant at a frequency that is equal to substantially one-half the frequency to which said intermediate-frequency amplifier is tuned, said resonant frequency being high with respect to the repetition rate of the transmitted pulses, means for shock exciting said tuned circuit by means of pulses received directly from the transmitter whereby each of said received pulses produces a damped wave train, said wave trains extending into said predetermined time interval, means for applying said wave trains to said first detector with said wave trains having sufficient amplitude to produce a second-harmonic wave train, and means for applying said second-harmonic wave train to said intermediate-frequency amplifier.

SIMEON I. TOURSHOU.